(12) United States Patent
Branco et al.

(10) Patent No.: US 8,938,949 B2
(45) Date of Patent: Jan. 27, 2015

(54) SCR EXHAUST GAS AFTERTREATMENT DEVICE

(75) Inventors: Alexandre Branco, Schwebheim (DE);
Heico Stegmann, Reichenberg (DE);
Friedrich Zapf, Karlstadt (DE)

(73) Assignee: Cummins Ltd., Staines, Middlesex (GB)

( * ) Notice: Subject to any disclaimer, the term of this patent is extended or adjusted under 35 U.S.C. 154(b) by 555 days.

(21) Appl. No.: 12/804,896

(22) Filed: Jul. 30, 2010

(65) Prior Publication Data
US 2011/0023466 A1    Feb. 3, 2011

(30) Foreign Application Priority Data

Aug. 3, 2009 (DE) .......................... 10 2009 035 940

(51) Int. Cl.
*F01N 3/24* (2006.01)
*B01D 53/94* (2006.01)
*B01D 53/90* (2006.01)
*F01N 3/20* (2006.01)

(52) U.S. Cl.
CPC ............ *B01D 53/9431* (2013.01); *B01D 53/90* (2013.01); *F01N 3/208* (2013.01); *B01D 2251/2067* (2013.01); *B01D 2257/404* (2013.01); *F01N 2610/02* (2013.01); *F01N 2610/146* (2013.01); *F01N 2610/1473* (2013.01); *F01N 2900/0408* (2013.01); *F01N 2900/1808* (2013.01); *Y02T 10/24* (2013.01)
USPC .................................. 60/295; 60/286; 60/301

(58) Field of Classification Search
USPC ..................................... 60/286, 295, 301, 303
See application file for complete search history.

(56) References Cited

U.S. PATENT DOCUMENTS

| | | | |
|---|---|---|---|
| 1,059,370 | A | 4/1913 | Johnson |
| 1,971,026 | A | 8/1934 | Beall |
| 1,999,221 | A | 4/1935 | Walker et al. |
| 2,697,581 | A | 12/1954 | Ray |

(Continued)

FOREIGN PATENT DOCUMENTS

| | | |
|---|---|---|
| CA | 2 199 737 | 3/1996 |
| CH | 359182 | 12/1961 |

(Continued)

OTHER PUBLICATIONS

Bürkert Fluid Control Systems, "Solenoid Valves with Piston, Servo-Assisted", archived Jan. 10, 2005 (1 page).

(Continued)

*Primary Examiner* — Thomas Denion
*Assistant Examiner* — Jorge Leon, Jr.
(74) *Attorney, Agent, or Firm* — Foley & Lardner LLP

(57) ABSTRACT

The invention relates to an SCR exhaust gas aftertreatment device, particularly for diesel motor internal combustion engines having a very large exhaust gas volume and/or divided exhaust gas trains. In order to be able to manufacture this SCR exhaust gas aftertreatment device in a cost-efficient manner, also for a high mixing degree of exhaust gas and AUS, it is proposed that a plurality of metering units ($D_1$, $D_2$, $D_n$) is provided, each of which has an atomizing nozzle, which nozzle-injects the aqueous urea solution into the exhaust gas train. In this case, the pressure existing in a common line for all metering units ($D_1$, $D_2$, $D_n$) can be determined by means of a pressure sensor.

23 Claims, 9 Drawing Sheets

(56) References Cited

U.S. PATENT DOCUMENTS

| | | | |
|---|---|---|---|
| 2,938,703 A | 5/1960 | Dietz | |
| 3,125,063 A | 3/1964 | Hultgren | |
| 3,492,868 A | 2/1970 | Pontis | |
| 3,707,954 A | 1/1973 | Nakada et al. | |
| 3,894,432 A | 7/1975 | Coughlin | |
| 3,903,858 A | 9/1975 | Hecht | |
| 3,958,757 A | 5/1976 | Happel et al. | |
| 4,146,485 A | 3/1979 | Broad | |
| 4,203,554 A | 5/1980 | Zimmer et al. | |
| 4,312,382 A | 1/1982 | Gebauer | |
| 4,529,512 A | 7/1985 | Williamson et al. | |
| 4,530,486 A | 7/1985 | Rusnak | |
| 4,595,037 A | 6/1986 | LeBreton et al. | |
| 4,610,786 A | 9/1986 | Pearson | |
| 4,693,202 A | 9/1987 | Helpiö | |
| 4,714,234 A | 12/1987 | Falk et al. | |
| 4,742,964 A | 5/1988 | Ito et al. | |
| 4,805,837 A | 2/1989 | Brooks et al. | |
| 4,836,923 A | 6/1989 | Popoff et al. | |
| 4,839,048 A | 6/1989 | Reed et al. | |
| 4,842,737 A | 6/1989 | Reed | |
| 4,963,332 A | 10/1990 | Brand et al. | |
| 5,002,230 A | 3/1991 | Norskov et al. | |
| 5,009,367 A | 4/1991 | Nielsen | |
| 5,017,285 A | 5/1991 | Janik et al. | |
| 5,045,192 A | 9/1991 | Terhune | |
| 5,114,077 A | 5/1992 | Cerny | |
| 5,122,264 A | 6/1992 | Mohr et al. | |
| 5,236,579 A | 8/1993 | Janik et al. | |
| 5,238,224 A | 8/1993 | Horsting | |
| 5,299,776 A | 4/1994 | Brinn, Jr. et al. | |
| 5,356,034 A | 10/1994 | Schlumberger | |
| 5,399,264 A | 3/1995 | Pulek et al. | |
| 5,413,711 A | 5/1995 | Janik | |
| 5,468,388 A | 11/1995 | Goddard et al. | |
| 5,522,218 A | 6/1996 | Lane et al. | |
| 5,605,042 A | 2/1997 | Stutzenberger | |
| 5,680,879 A | 10/1997 | Sheih et al. | |
| 5,685,985 A | 11/1997 | Brown et al. | |
| 5,884,475 A | 3/1999 | Hofmann et al. | |
| 5,968,464 A | 10/1999 | Peter-Hoblyn et al. | |
| 5,976,475 A | 11/1999 | Peter-Hoblyn et al. | |
| 6,063,350 A | 5/2000 | Tarabulski et al. | |
| 6,105,884 A | 8/2000 | Molnar et al. | |
| 6,125,629 A | 10/2000 | Patchett | |
| 6,203,770 B1 | 3/2001 | Peter-Hoblyn et al. | |
| 6,209,315 B1 | 4/2001 | Weigl | |
| 6,273,120 B1 * | 8/2001 | Hofmann et al. | 137/98 |
| 6,279,603 B1 | 8/2001 | Czarnik et al. | |
| 6,306,192 B1 | 10/2001 | Greif et al. | |
| 6,474,961 B1 | 11/2002 | Timmer et al. | |
| 6,513,323 B1 | 2/2003 | Weigl et al. | |
| 6,516,607 B1 | 2/2003 | Brück | |
| 6,517,047 B2 | 2/2003 | Koch-Groeber | |
| 6,526,746 B1 | 3/2003 | Wu | |
| 6,539,708 B1 | 4/2003 | Hofmann et al. | |
| 6,554,139 B1 | 4/2003 | Maxwell et al. | |
| 6,631,883 B1 | 10/2003 | Van Den Brink | |
| 6,685,829 B1 | 2/2004 | Baumann et al. | |
| 6,708,904 B2 | 3/2004 | Itatsu | |
| 6,912,846 B2 | 7/2005 | Huber et al. | |
| 6,945,035 B2 | 9/2005 | Hirooka et al. | |
| 7,000,381 B2 | 2/2006 | Maisch | |
| 7,100,366 B2 | 9/2006 | Hager et al. | |
| 7,156,239 B2 | 1/2007 | Klotz et al. | |
| 7,278,625 B2 | 10/2007 | Huber et al. | |
| 7,296,689 B2 | 11/2007 | Klotz et al. | |
| 7,316,545 B2 | 1/2008 | Lenke | |
| 7,393,187 B2 | 7/2008 | Weigl | |
| 7,458,204 B2 | 12/2008 | Plougmann | |
| 7,481,049 B2 | 1/2009 | Huber et al. | |
| 7,509,799 B2 | 3/2009 | Amou et al. | |
| 7,594,393 B2 | 9/2009 | Offenhuber et al. | |
| 7,594,516 B2 | 9/2009 | Maisch et al. | |
| 7,617,991 B2 | 11/2009 | Wells et al. | |
| 7,866,144 B2 | 1/2011 | Bakaj et al. | |
| 7,882,697 B2 * | 2/2011 | Ichikawa | 60/286 |
| 7,895,829 B2 | 3/2011 | Suzuki et al. | |
| 8,074,673 B2 | 12/2011 | Maisch et al. | |
| 2002/0001554 A1 | 1/2002 | Czarnik et al. | |
| 2002/0078732 A1 | 6/2002 | Bentley | |
| 2002/0081239 A1 | 6/2002 | Palesch et al. | |
| 2002/0088955 A1 | 7/2002 | Gamou et al. | |
| 2003/0024320 A1 | 2/2003 | Bentley | |
| 2003/0033799 A1 | 2/2003 | Scheying | |
| 2003/0101716 A1 | 6/2003 | Hirooka et al. | |
| 2003/0168620 A1 | 9/2003 | Dralyuk | |
| 2003/0209482 A1 | 11/2003 | Klotz et al. | |
| 2003/0209484 A1 | 11/2003 | Klotz et al. | |
| 2004/0060286 A1 | 4/2004 | Huber et al. | |
| 2004/0093856 A1 | 5/2004 | Dingle et al. | |
| 2004/0098978 A1 | 5/2004 | Tarabulski et al. | |
| 2004/0101450 A1 | 5/2004 | Mayer | |
| 2004/0103641 A1 | 6/2004 | Maisch | |
| 2004/0159721 A1 | 8/2004 | Shiraishi et al. | |
| 2004/0179960 A1 | 9/2004 | Lenke | |
| 2004/0191093 A1 | 9/2004 | Weigl | |
| 2004/0262333 A1 | 12/2004 | Huber et al. | |
| 2005/0069468 A1 | 3/2005 | Huber et al. | |
| 2005/0229969 A1 | 10/2005 | Nguyen et al. | |
| 2005/0284134 A1 * | 12/2005 | Radhamohan et al. | 60/286 |
| 2005/0284136 A1 | 12/2005 | Plougmann | |
| 2006/0196172 A1 | 9/2006 | Johnson et al. | |
| 2008/0087008 A1 * | 4/2008 | Reba et al. | 60/301 |
| 2008/0087009 A1 * | 4/2008 | Nishina et al. | 60/301 |
| 2008/0148716 A1 * | 6/2008 | Nishibu et al. | 60/295 |
| 2008/0148717 A1 * | 6/2008 | Ohshima et al. | 60/295 |
| 2008/0178580 A1 * | 7/2008 | Zapf et al. | 60/295 |
| 2008/0282681 A1 * | 11/2008 | Katou et al. | 60/286 |
| 2008/0311010 A1 | 12/2008 | Boe | |
| 2009/0013670 A1 | 1/2009 | Cooke | |
| 2009/0031711 A1 * | 2/2009 | Braun et al. | 60/297 |
| 2009/0038292 A1 | 2/2009 | Plougmann | |
| 2009/0179087 A1 | 7/2009 | Martin et al. | |
| 2009/0193794 A1 * | 8/2009 | Robel et al. | 60/295 |
| 2009/0229258 A1 * | 9/2009 | Zapf et al. | 60/295 |
| 2009/0301067 A1 * | 12/2009 | Dingle et al. | 60/286 |
| 2010/0139260 A1 * | 6/2010 | Rodman et al. | 60/303 |
| 2010/0242439 A1 * | 9/2010 | Domon et al. | 60/274 |

FOREIGN PATENT DOCUMENTS

| | | |
|---|---|---|
| CN | 101943027 A | 7/2009 |
| DE | 1 148 614 | 5/1963 |
| DE | 2 121 533 | 11/1972 |
| DE | 2 211 096 | 9/1973 |
| DE | 24 59 790 | 7/1976 |
| DE | 28 12 076 | 10/1979 |
| DE | 83 06 612 | 8/1983 |
| DE | 39 01 032 | 2/1990 |
| DE | 38 33 134 | 4/1990 |
| DE | 41 04 382 | 8/1992 |
| DE | 42 37 900 | 5/1993 |
| DE | 42 30 056 | 3/1994 |
| DE | 43 21 927 | 1/1995 |
| DE | 44 32 576 | 3/1996 |
| DE | 44 32 577 | 3/1996 |
| DE | 44 36 397 | 4/1996 |
| DE | 195 36 613 | 11/1996 |
| DE | 198 17 994 | 11/1999 |
| DE | 198 40 569 | 3/2000 |
| DE | 199 08 671 | 8/2000 |
| DE | 199 35 920 | 3/2001 |
| DE | 199 45 900 | 4/2001 |
| DE | 199 47 197 | 4/2001 |
| DE | 199 47 198 | 4/2001 |
| DE | 100 47 516 | 4/2002 |
| DE | 100 47 531 | 4/2002 |
| DE | 100 52 077 | 5/2002 |
| DE | 100 52 103 | 5/2002 |
| DE | 100 58 015 | 5/2002 |
| DE | 101 39 142 | 2/2003 |
| DE | 101 47 172 | 4/2003 |
| DE | 101 50 518 | 5/2003 |

(56) References Cited

FOREIGN PATENT DOCUMENTS

| | | |
|---|---|---|
| DE | 101 39 139 | 6/2003 |
| DE | 101 61 132 | 6/2003 |
| DE | 102 56 169 | 6/2003 |
| DE | 102 20 672 | 11/2003 |
| DE | 699 10 605 | 6/2004 |
| DE | 699 10 776 | 6/2004 |
| DE | 103 41 996 | 3/2005 |
| DE | 20 2005 002 544 | 5/2005 |
| DE | 103 59 522 | 7/2005 |
| DE | 10 2004 003 201 | 8/2005 |
| DE | 102 20 662 | 8/2005 |
| DE | 10 2004 006 333 | 9/2005 |
| DE | 10 2004 035 119 | 2/2006 |
| DE | 10 2004 054 238 | 5/2006 |
| DE | 20 2004 020 234 | 5/2006 |
| DE | 10 2005 056 395 | 11/2006 |
| DE | 10 2005 030 421 | 1/2007 |
| DE | 10 2005 037 150 | 2/2007 |
| DE | 298 25 250 | 2/2007 |
| DE | 10 2006 014 074 | 10/2007 |
| DE | 103 62 140 | 4/2008 |
| DE | 10 2007 004 687 | 8/2008 |
| DE | 10 2008 012 780 | 9/2009 |
| DE | 10 2008 054 803 | 6/2010 |
| EP | 0 663 226 | 7/1995 |
| EP | 0 826 097 | 3/1998 |
| EP | 1 236 499 | 9/2002 |
| EP | 1 281 426 | 2/2003 |
| EP | 1 314 864 | 5/2003 |
| EP | 1 360 983 | 11/2003 |
| EP | 1 435 458 | 7/2004 |
| EP | 1 481 719 | 12/2004 |
| EP | 1 656 986 | 5/2006 |
| EP | 1656986 A1 | 5/2006 |
| EP | 1 950 386 | 7/2008 |
| EP | 2 014 886 | 1/2009 |
| EP | 2 310 646 | 4/2011 |
| GB | 2 137 110 | 10/1984 |
| JP | 56 164287 | 12/1981 |
| JP | 61197013 | 9/1986 |
| JP | 2000-240429 | 9/2000 |
| JP | 2001280189 | 10/2001 |
| JP | 2002525491 | 8/2002 |
| WO | 01/91881 | 12/2001 |
| WO | 02/27280 | 4/2002 |
| WO | 02/42616 | 5/2002 |
| WO | 02/50497 | 6/2002 |
| WO | 03/016687 | 2/2003 |
| WO | 03/085270 | 10/2003 |
| WO | 2004/079168 | 9/2004 |
| WO | 2006122561 | 11/2006 |
| WO | WO-2009/010569 | 1/2009 |

OTHER PUBLICATIONS

2nd Office Action, Application No. 201010243932.8, State Intellectual Property Office of the People's Republic of China, Jan. 25, 2013.
Notice of Objection received for German Patent Appln. No. 10 2009 035 940 dated Nov. 22, 2013. (English Translation provided.).

* cited by examiner

SCR EXHAUST GAS AFTERTREATMENT DEVICE

This application claims the benefit of German Patent Application No. 10 2009 035 940.0 filed on Aug. 3, 2009.

The present disclosure relates to the subject matter disclosed in German patent application number 10 2009 035 940.0, which is incorporated herein by reference in its entirety and for all purposes.

BACKGROUND OF THE INVENTION

The invention relates to an SCR exhaust gas aftertreatment device which is particularly useful, e.g., for diesel motor internal combustion engines having a very large exhaust gas volume and/or divided exhaust gas trains.

Already known from DE 198 17 994 A1—first embodiment—is an exhaust gas aftertreatment device in which a pump pumps ammonia from an ammonia reservoir into a line and places it therein under constant pressure. Four metering valves open off the line. Each of these metering valves feeds the ammonia into the partial train of an exhaust gas manifold, which is assigned to a combustion compartment of an internal combustion engine. In this way, nitrogen oxides ($NO_x$) will be reduced in the exhaust gas.

In its embodiment of FIG. 2A, DE 699 10 605 T2 relates to an SCR catalyst in which urea is fed directly in stages to the SCR catalyst by means of three metering valves, at the beginning, in the middle, and at the end.

DE 41 04 382 A1 relates to a gas turbine in which an aqueous ammonia solution is fed by means of three nozzles to points of various compression.

The unpublished DE 10 2008 012 780 relates to an SCR exhaust gas aftertreatment device in which a supply unit is employed together with a diaphragm pump and a pressure filter. Further provided is a metering unit, which has a pressure sensor, a valve, and an atomizer. As a reductant, an aqueous urea solution circulates in an open circuit. The open circuit, along with other measures, ensures that aqueous urea solution expanding below the freezing point cannot damage the SCR exhaust gas aftertreatment device. Provided in the metering unit in order to build up sufficient pressure at the valve for the atomizer, in spite of the open circuit, is a backflow restrictor.

The problem of the invention is to create a low-cost SCR exhaust gas aftertreatment device for internal combustion engines having very large exhaust gas volumes and/or divided exhaust gas trains.

This object is achieved in accordance with the invention by the features of patent claim 1.

SUMMARY OF THE INVENTION

The aqueous urea solution will be referred to below abbreviated as AUS.

The SCR exhaust gas aftertreatment device according to the invention can be employed, in particular, in ship diesel engines, stationary diesel engines, construction machine engines, large emergency electric power systems, and engines having divided cylinder banks, such as V engines and W engines.

Provided in accordance with the invention are a plurality of metering units, which have a metering valve and an atomizing nozzle, so that the AUS can be nozzle-injected at a plurality of points of the large exhaust gas volume or the divided exhaust gas train. This alone ensures a better distribution or at least enables such a distribution in a divided exhaust gas train. In addition, the atomization has the advantage over injection—in particular over the injection of a barely distributed AUS jet onto a hot face of the exhaust gas pipe—of an appreciably better distribution with a correspondingly large reactive surface of the AUS. As a result, a very high fraction of the AUS is completely reacted, so that especially good exhaust gas values can be attained with low AUS consumption. This is particularly advantageous for large exhaust gas volumes, which already pose a blending problem. Also, no hot face is required, which would have to be heated additionally during the start-up operation or in the warm-up phase. For example, an atomizing nozzle can be realized by means of a plurality of discs, which have slits and/or perforations such that they divert the AUS repeatedly, so that the AUS is imparted a strong swirl on exiting the atomizing nozzle. This swirl provides for an atomization of the AUS when it enters the exhaust gas flow. Such swirl nozzles are known from the field of heating burners, which is a concept outside the field of the invention. Swirl nozzles are also given the English name "pressure swirl atomizer" as a technical term.

Present in accordance with the invention is a pressure sensor, which, in comparison to a purely mechanical—that is, spring-controlled—pressure regulation, enables a precise regulation of the pressure. This precise regulation of the pressure enables, in turn, an especially high metering accuracy. In a particularly advantageous embodiment of the invention, the function of a temperature sensor can be integrated into this pressure sensor. In another particularly advantageous embodiment of the invention, the pressure sensor is arranged in the metering unit, so that the temperature of the aqueous urea solution can be measured directly in spatial proximity prior to nozzle injection into the exhaust gas flow. This configuration allows a relatively high pressure to be applied, which supports the fine atomization in large exhaust gas volumes. Used in a particularly advantageous embodiment of the invention for application of this high pressure is a diaphragm pump, which, even at this high pressure, protects the pump drive against the aggressive AUS to a special degree on account of the sealing diaphragm. In a particularly advantageous embodiment of the invention, the diaphragm of the diaphragm pump is moved back and forth by a crankshaft drive or by an eccentric gearing. Such a membrane pump drive enables very high pressures to be attained, which makes possible an even finer atomization of the AUS in the exhaust gas flow with the aforementioned advantages.

Provided in accordance with the invention is a proportional valve, which regulates the through-flow from the metering unit to the AUS tank, from which the AUS is pumped again via the pump and the common line to the metering valves opening off the latter. This circuit ensures that cooled AUS can constantly reach the metering valves and that heat supplied by hot exhaust gas can be dissipated. In addition, the proportional valve allows a passive protection against freezing of the circuit to be realized, when it is ensured that the proportional valve is in the open position in the absence of a supply of electric power. As a result, even after the system is switched off, it is ensured that no pressurized AUS is present any longer in the SCR exhaust gas aftertreatment device. This also secures the common line, from which the metering units are supplied with the AUS, against damage due to freezing. This protection against freezing functions even when a pump after-run is no longer possible, because, for example, the electric power supply to the SCR exhaust gas aftertreatment device is interrupted due to actuation of the "emergency shut-off."

In a particularly advantageous embodiment of the invention, all of the metering units have their own pressure sensor. A mean value can then be formed from the pressure values of the pressure sensors for the control of the pump. Particularly when a diaphragm pump having an electric motor crankshaft drive is used, it is possible to regulate the speed of the electric motor of the diaphragm pump. This makes possible a modular system in a cost-efficient manner, in which the same metering units that are also used in motor vehicles having only one metering unit in the SCR exhaust gas aftertreatment device are used. This in itself "superfluous" use of pressure sensors is economically reasonable, because the unit numbers for the special engines mentioned in the beginning—ship diesel engines, stationary diesel engines, W engines, etc.—are relatively small in comparison to those of standard engines. Included in the standard engines are, in particular, in-line engines having three to six cylinders, such as those employed in automobiles and commercial vehicles.

In a particularly advantageous embodiment of the invention, the metering units are classified with the atomizing nozzles, with only metering units of one class being employed at the SCR exhaust gas aftertreatment device. In this way, the tolerances of the metering units and, in particular, the tolerances of the atomizing units can be compensated. Thus, depending on manufacture, the pressure that has to be applied varies so as to supply a defined quantity of AUS through the respective atomizing nozzle. However, the pressure sensors in the metering units have analyzing electronics with an engine program map in which the output voltage is plotted via the pressure. This engine map can be calculated. As a result, for each metering unit, it is possible to measure the pressure that is required in order to eject a defined quantity of AUS. Correspondingly, the engine map of the pressure sensor is calibrated so that the metering units can be divided into classes. If, for example, it is known that the atomizer varies by +/−6%, it is possible to make a division into the following classes through calibration of the characteristic line of the analyzing electronics of the pressure sensor:

Class A: 94% nominal pressure to 96% nominal pressure
Class B: >96% nominal pressure to 98% nominal pressure
Class C: >98% nominal pressure to 100% nominal pressure
Class D: >100% nominal pressure to 102% nominal pressure
Class E: >102% nominal pressure to 104% nominal pressure
Class F: >104% nominal pressure to 106% nominal pressure On a given internal combustion engine, then, only metering units of one of the classes A to F may be used. This results in a simplification of the servicing and the provision of replacement parts, because no setting needs to be changed, but rather attention needs to be paid only to the use of replacement parts of the same class. The mean value of all output voltages of the pump sensors then forms the theoretical value for the control circuit of the pump pressure.

Particularly in the case of the modular system described above, in which nearly the same metering units are used for the mass market of internal combustion engines as are used for large-volume internal combustion engines having a plurality of AUS nozzle-injection points, it is possible to design the metering units for the mass market with unchangeable backflow restrictors that are adjusted only once, whereas the metering units for the large-volume internal combustion engines are designed without the backflow restrictors and, instead, have the above-described, central, continuously adjustable proportional valve for all metering units.

Provided in the supply unit according to another advantage of the invention is a fine pressure filter, which protects the atomizing nozzles of the metering units from becoming clogged. In this case, this fine pressure filter is arranged in the AUS flow downstream of the diaphragm pump. As a result, the pressure loss at the fine pressure filter is less noticeable than when this pressure filter is arranged in the suction intake channel upstream of the diaphragm pump. In an advantageous embodiment, the diaphragm can be protected by means of a coarse intake filter against coarse contaminants, with only a small pressure loss occurring at this coarse intake filter. As a result, the diaphragm pump—in particular its check valves—are also protected against contaminant particles. Accordingly, it is possible to ensure the functional reliability of the diaphragm pump to an especially high degree.

According to another advantageous embodiment, a control unit for controlling the diaphragm pump is integrated into the supply unit. In this case, in a particularly advantageous embodiment, a thermally loaded circuit board of this control unit can be fixed in place within a housing at an outward-facing metal plate in a dust-protected manner, so that the heat of the circuit board can be dissipated out of the housing. In order to enhance this cooling of the circuit board, the metal plate can be furnished with cooling ribs outside of the housing.

In a particularly advantageous embodiment, the supply unit can be connected to the cooling water circuit of the motor vehicle drive engine. As a result, for example, the AUS and/or the control unit can be thawed by the cooling water circuit of the motor vehicle drive engine.

In a particularly advantageous embodiment, it is possible to provide an electric heating for the metering unit for fast thawing.

Further advantages of the invention ensue from the other patent claims, the description, and the drawing. The invention is described in detail below on the basis of an exemplary embodiment.

BRIEF DESCRIPTION OF THE DRAWINGS

Shown here are.

DETAILED DESCRIPTION OF THE INVENTION

Figure 1:
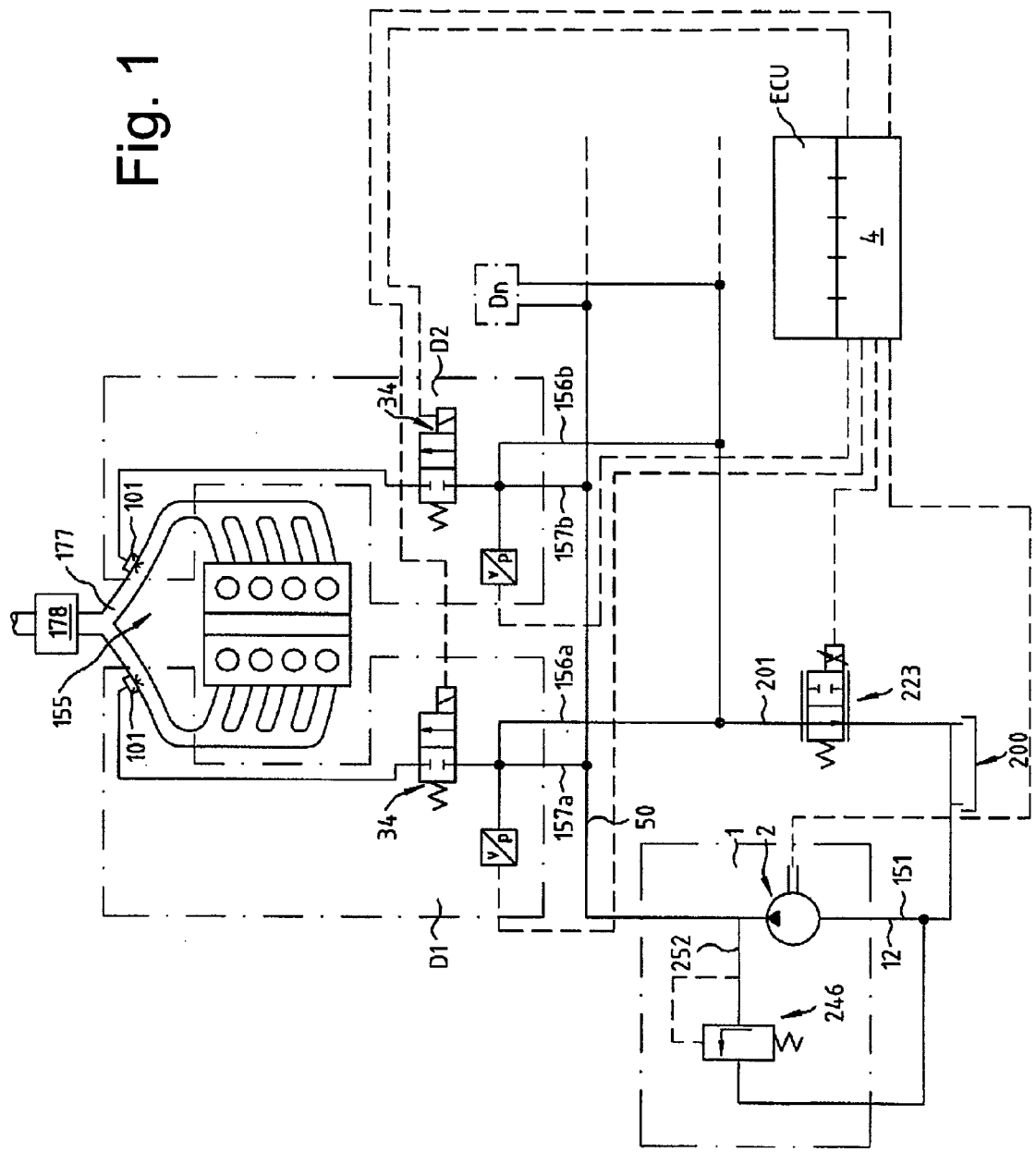
FIG. 1, the circuit diagram of an SCR exhaust gas aftertreatment device having a supply unit and a plurality of metering units, FIG. 2, in detail, the supply unit illustrated only schematically in FIG. 1, which comprises a diaphragm pump with a diaphragm, FIG. 3, a detail of the diaphragm pump of FIG. 2 in the region of the diaphragm, FIG. 4, the supply unit of FIG. 2 in a view from below, with the pump unit being illustrated in an exploded view in the region of the AUS connections and a pressure-limiting valve, and FIG. 5, the supply unit of FIG. 2, FIG. 4 in a view from above, with the supply unit being illustrated in an exploded view in the region of a compressible compensating element, FIG. 6, the supply unit of FIG. 2 to FIG. 5 in a view from above, with the supply unit being illustrated in an exploded view in the region of a cooling water connection, FIG. 7, a stamped circuit board, which is overmolded by plastic of the supply unit, FIG. 8, in a first view, the first metering unit of the metering units illustrated only schematically in FIG. 1, FIG. 9, the metering unit of FIG. 8 in a second view, FIG. 10, a nozzle disc of an atomizing nozzle, which is employed in the metering units, FIG. 11, another nozzle disc, which, together with the nozzle disc according to FIG. 10, forms a nozzle disc packet, and FIG. 12, an adapter plate, which is arranged between the nozzle disc packet and a valve seat of the metering units.

FIG. 1 shows the circuit diagram of an SCR exhaust gas aftertreatment device. By means of this SCR exhaust gas aftertreatment device, an AUS is injected into an exhaust gas train 177 of a large-displacement internal combustion engine 155—in particular, a diesel engine. Provided for this purpose is a supply unit 1 with a pump 2. In this case, this supply unit 1 sucks in the AUS from a tank 200, pressurizes it, and passes it under pressure via a common line 50 to a plurality of metering units $D_1, D_2, D_n$.

These metering units $D_1, D_2, D_n$ nozzle-inject a portion of the AUS into the hot exhaust gas flow via atomizing nozzles 101. Moreover, the metering units $D_1, D_2, D_n$ are cooled by AUS circulating in the circuit between the supply unit 1 and the metering units $D_1, D_2, D_n$.

Figure 2:
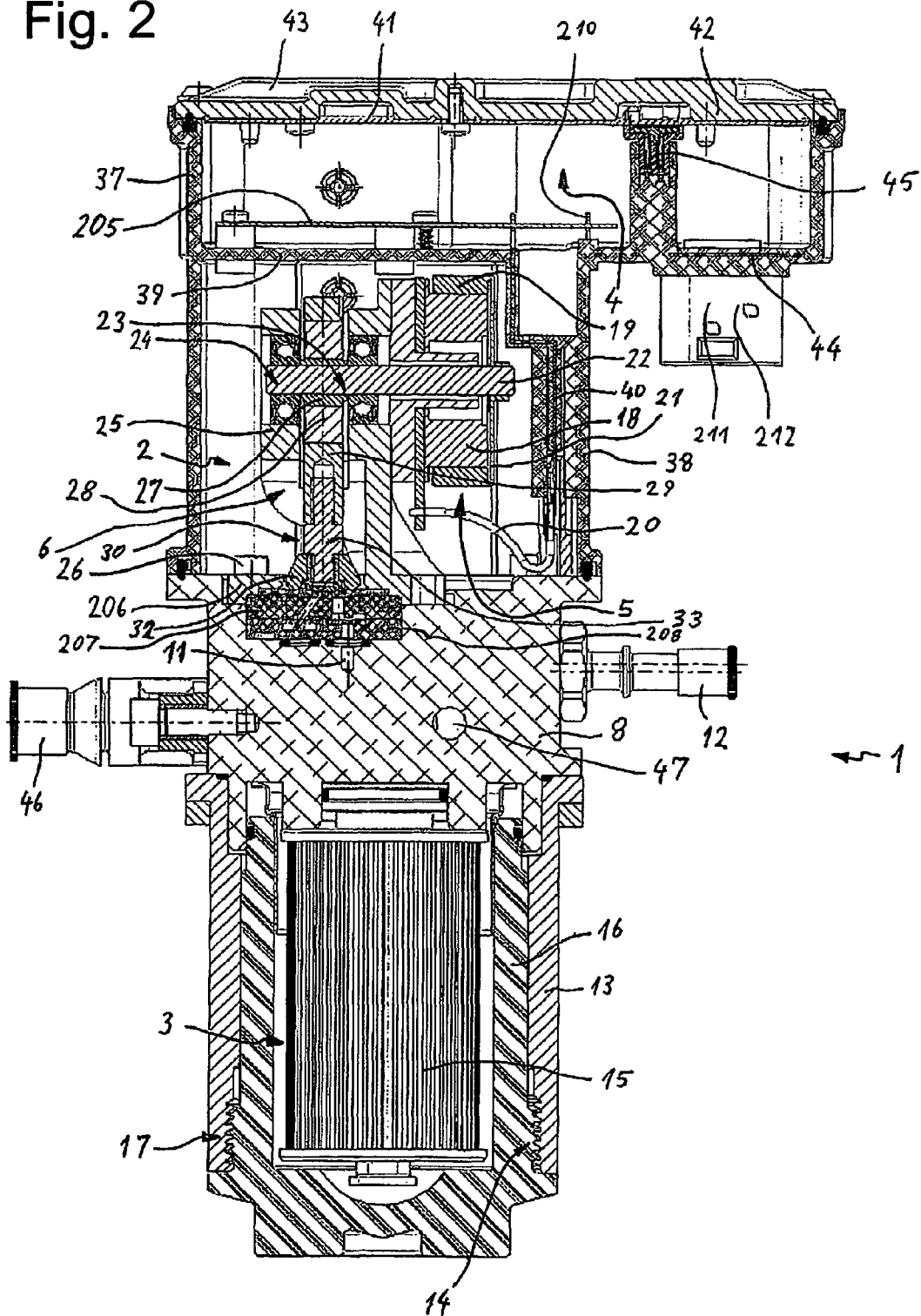

FIG. 2 shows that the supply unit 1 comprises, besides said pump 2, also a pressure filter 3 and a control unit 4.

Figure 3:
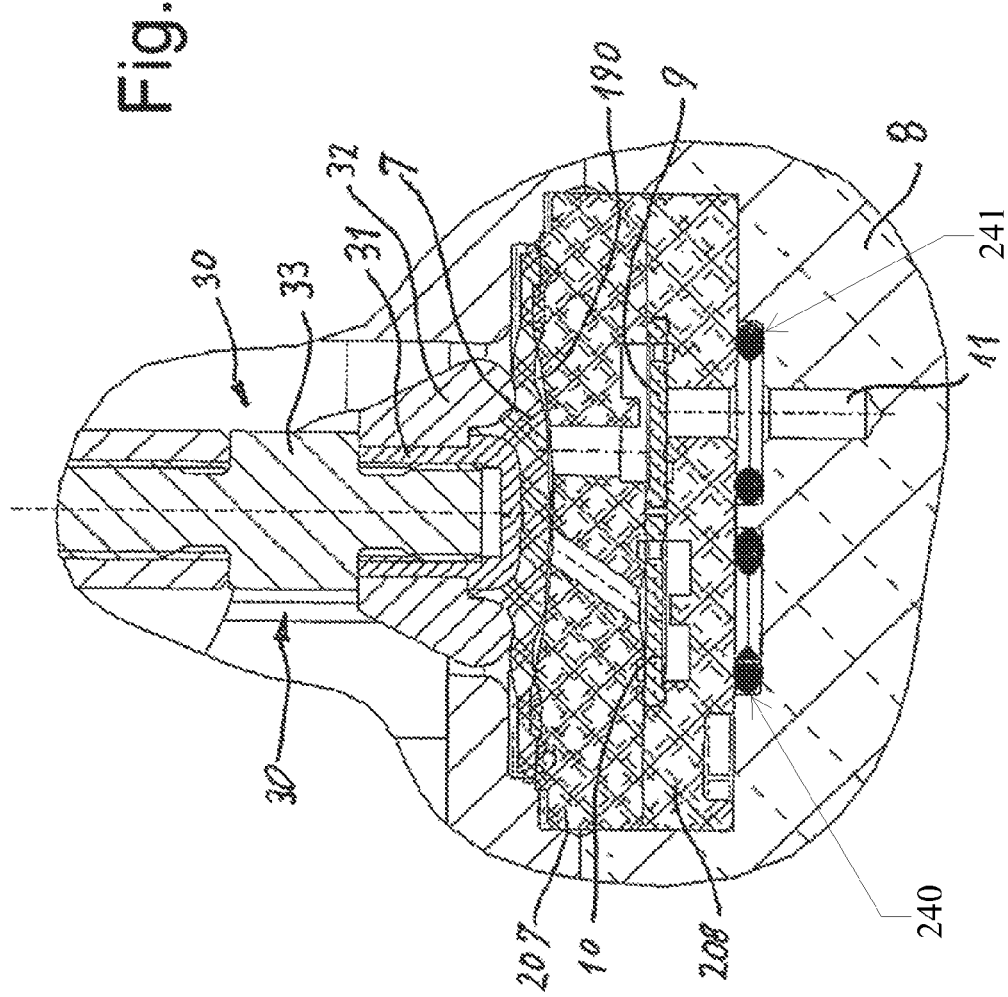
Figure 4:
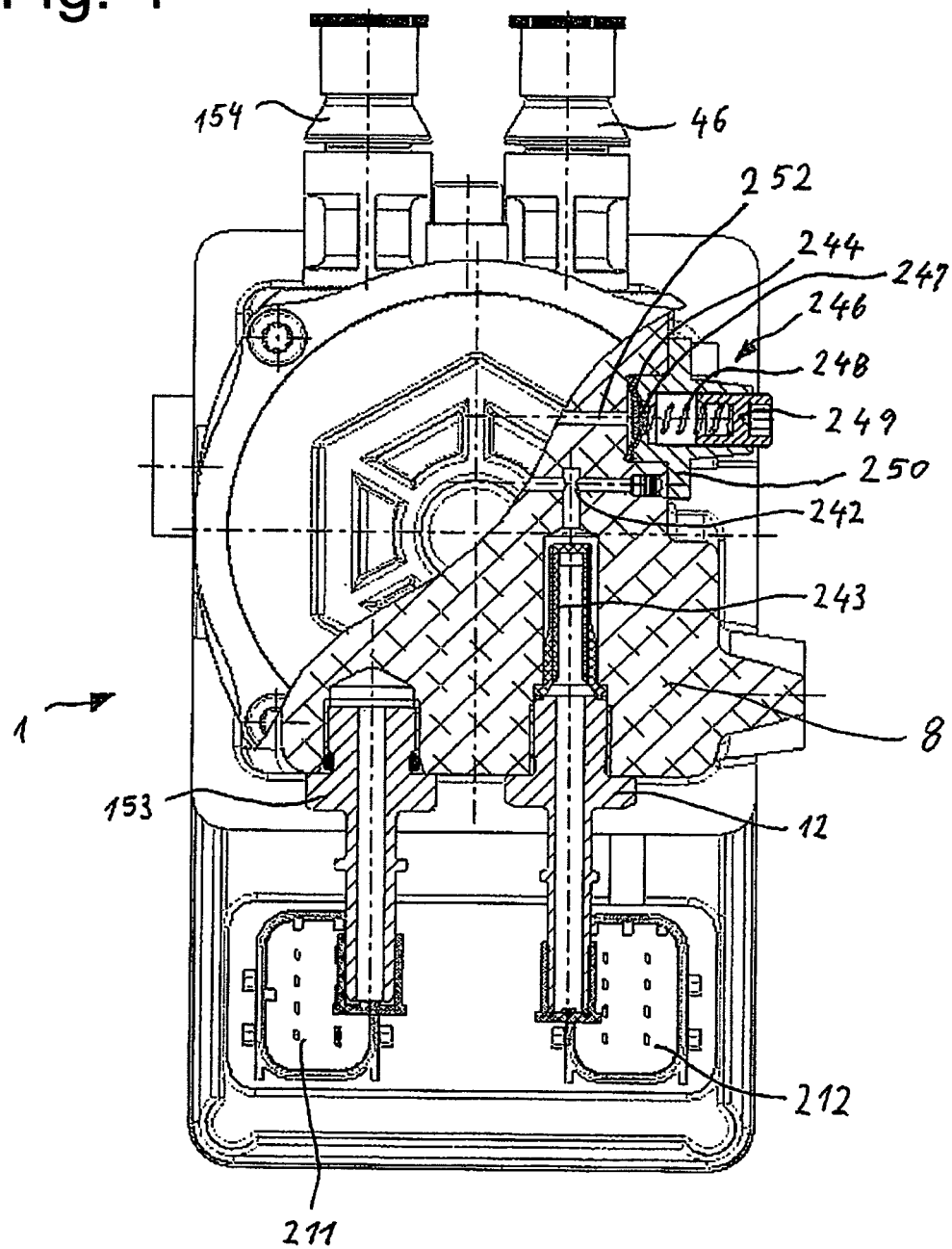

The pump 2 is designed as a diaphragm pump and comprises a brushless electric motor 5 having an eccentric gearing 6 operating similarly to a crankshaft drive. This eccentric gearing 6 moves back and forth the central region of a diaphragm 7, which is clamped at its rim in an intermediate housing 8. Placed in this intermediate housing 8 are, in addition, two plastic discs 207, 208, which can be seen in more detail in FIG. 3 and are designed as injection-molded parts. In this case, the upper plastic disc 207 is placed on the lower plastic disc 208 in such a manner that, as a result of the tongue-like moldings in the region of contact between the two plastic discs 207, 208, two check valves 9, 10 are formed. These two check valves 9, 10 are designed as shutter valves. Provided in the plastic discs 207, 208, furthermore, are the channels required for the AUS through-flow. One of the check valves 10 opens in one direction, so that a pressure chamber 190 that can be pressurized by the diaphragm 7 can deliver pressurized AUS. The other check valve 9 opens in the opposite direction, so that the pressure chamber 190 can suck in AUS. A channel, incorporated independently into the intermediate housing 8, opens off of each check valve 9, 10. These channels are sealed by means of O-rings 240, 241. Only a partial segment 11 of these channels is seen in FIG. 2. The check valve 9 that sucks in AUS, sucks in the AUS via the partial segment 11 and another channel 242, which opens off it, from an AUS intake connection 12. This other channel 242 and an intake filter 243, arranged in front of it, are seen in FIG. 4. In this case, the intake filter 243 protects the pump 2 against coarse contaminants. This intake filter 243 is built into the AUS intake connection 12.

The AUS is conveyed out of the pressure chamber 190 from the diaphragm 7 via the other check valve 10 and the channel that opens off it, which is not seen in more detail, to the pressure filter 3. From this pressure filter 3, the AUS is conveyed to an AUS pressure connection 153, seen in FIG. 5. By means of this pressure filter 3, the metering units D.sub.1, D.sub.2, D.sub.n are protected against contaminant particles and thus against clogging. The AUS pressure connection 153 is joined to the metering units D.sub.1, D.sub.2, D.sub.n via the common line 50 seen in FIG. 1. The AUS intake connection 12 of the supply unit 1 is connected to the AUS tank 200 via the AUS line 151. Each of the metering units D.sub.1, D.sub.2, D.sub.n has two metering unit connections 156a, 157a, 156b, 157b. The metering unit connections 156a, 156b, conveying the AUS, are joined via parallel lines to another AUS line 201. This AUS line 201 is connected to the AUS tank 200 via a proportional valve 223, so that, via the proportional valve 223, which can be regulated continuously in terms of the degree of opening, a circuit is formed for the circulating AUS cooling the metering units D.sub.1, D.sub.2, D.sub.n. The degree of opening of the proportional valve 223 is regulated depending on the quantity of AUS that is nozzle-injected via the metering valves 34 and the atomizing nozzles 101 into the exhaust gas train 177. For example, when the quantity of AUS to be injected is at a maximum, proportional valve 223 may be set to a completely closed position. To this end, the metering valves 34 are connected via control wires to the control unit 4, which is in signal transmission with the ECU engine control via the CAN bus.

The pressure filter 3 comprises a filter cartridge 15, which is placed in a pot 16. In this case, this pot 16 has an outer thread 17, which is screwed into an inner thread 14 of a sleeve 13. In this case, the inner thread 14 is arranged at one end of the sleeve 13. At its other end, the sleeve 13 is joined in an immovable manner to the intermediate housing 8. Accordingly, the filter cartridge 15 is pulled tightly against the intermediate housing 8.

In order to bend the diaphragm 7 back and forth, the electric motor 5, which is designed in a space-saving manner as an external rotor, rotates. In accordance therewith, a stationary stator 18 of the electric motor 5 is surrounded radially within a rotor 19 by the latter. The stator 18 has coils with wires 20 that lead to an engine-control circuit board 205 within the control unit 4. On the side facing away from the eccentric gearing 6, the rotor 19 is connected to a centrally perforated disc 21, through the central hole of which a shaft 22 is inserted in such a manner that the rotor 19 and the shaft 22 do not rotate with respect to each other. The shaft 22 is roller-bearing-mounted in two roller bearings 23, 24 in the region of the eccentric gearing 6. These two roller bearings 23, 24 are accommodated in a bearing housing 25, which is joined to the intermediate housing 8 in an immovable manner. Provided for this purpose is a screw joint 26. In this case, the diaphragm 7 is clamped by means of this screw joint 26 between one support plate 206 of the bearing housing 25 and the upper plastic disc 207. A cam 27 is pressed onto the shaft 22 in frictional engagement in the region between the two roller bearings 23, 24. The central axis of this cam 27 is displaced parallel to the axis of rotation of the shaft 22. Arranged coaxially on the cam 27 is a roller bearer 28 of a connecting rod 29. Its other end is screwed via a threaded bolt 30 with a support bushing 31, which is joined in an immovable manner to a rounded contact sleeve 32. The support bushing 31 is vulcanized into the diaphragm 7. The contact sleeve 32 serves to support the diaphragm 7 during the pressure stroke. The threaded bolt 30 is furnished in the middle with a hex head 33 and has threads at its two ends.

The roller bearings 23, 24, and 28 have a permanent grease packing for lubrication.

The control unit 4 is arranged within a control housing 37, which is designed in one-piece with a pump housing 38. The control housing 37 is separated from the pump housing 38 in an oil-tight manner by means of a partition 39, with said wires 20 of the coils being connected to the engine control circuit board 205 by means of strip conductors 40, which are embedded in the injection-molded plastic material of the pump housing 38. The metering control, pressure regulation, sensor analysis, and CAN communication functions are located on another circuit board 41. The other circuit board 41 is screwed onto one side of an aluminum plate 42, on the other side of which cooling ribs 43 are arranged. This aluminum plate 42 is placed into an opening of the control housing 37 in such a manner that the cooling ribs 43 are directed outward and such that the heat is conveyed from the circuit board 41 with the electronics toward the outside.

Figure 7:
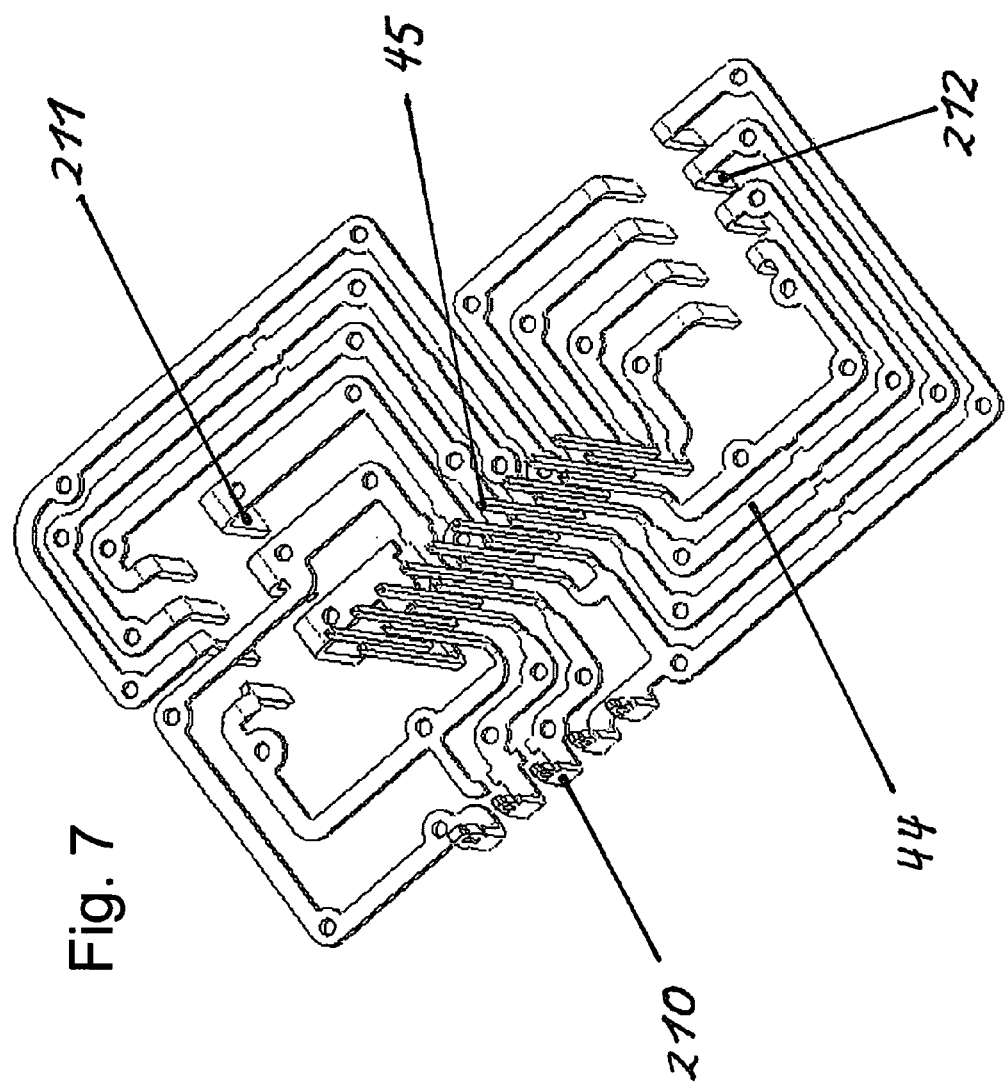

For connection of
the engine control circuit board 205,
the other circuit board 41, and
the CAN bus of the motor vehicle,
a stamped circuit board 44 is overmolded with the plastic of the control housing 37. This stamped circuit board 44 is also seen in FIG. 7 and has four knifelike contact plugs 45, 210, 211, 212 that extend vertically upward from the stamped circuit board 44. A 20-pin contact plug 45 makes a connection between the stamped circuit board 44 and the other circuit board 41. This connection is made when the circuit board 41 is plugged into the control housing 37. A 4-pin contact plug 210 makes the connection to the engine-control circuit board 205. There are two contact plugs 211, 212 for the connection to the outside. The 8-pin contact plug 211 is responsible for the connection to the metering units $D_1$, $D_2$, $D_n$ for the control or electric power supply of its metering valves 34,
the control or electric power supply of electric heaters (not visible in the illustrated views),
the electric power supply of pressure sensors 221, which, in addition, have the function of a temperature sensor, and
the signal reception from these pressure sensors 221.

The 7-pin contact plug 212 makes the connection to the motor vehicle electronics and to the voltage supply. In this case, the communication takes place via CAN bus signals.

Figure 5:
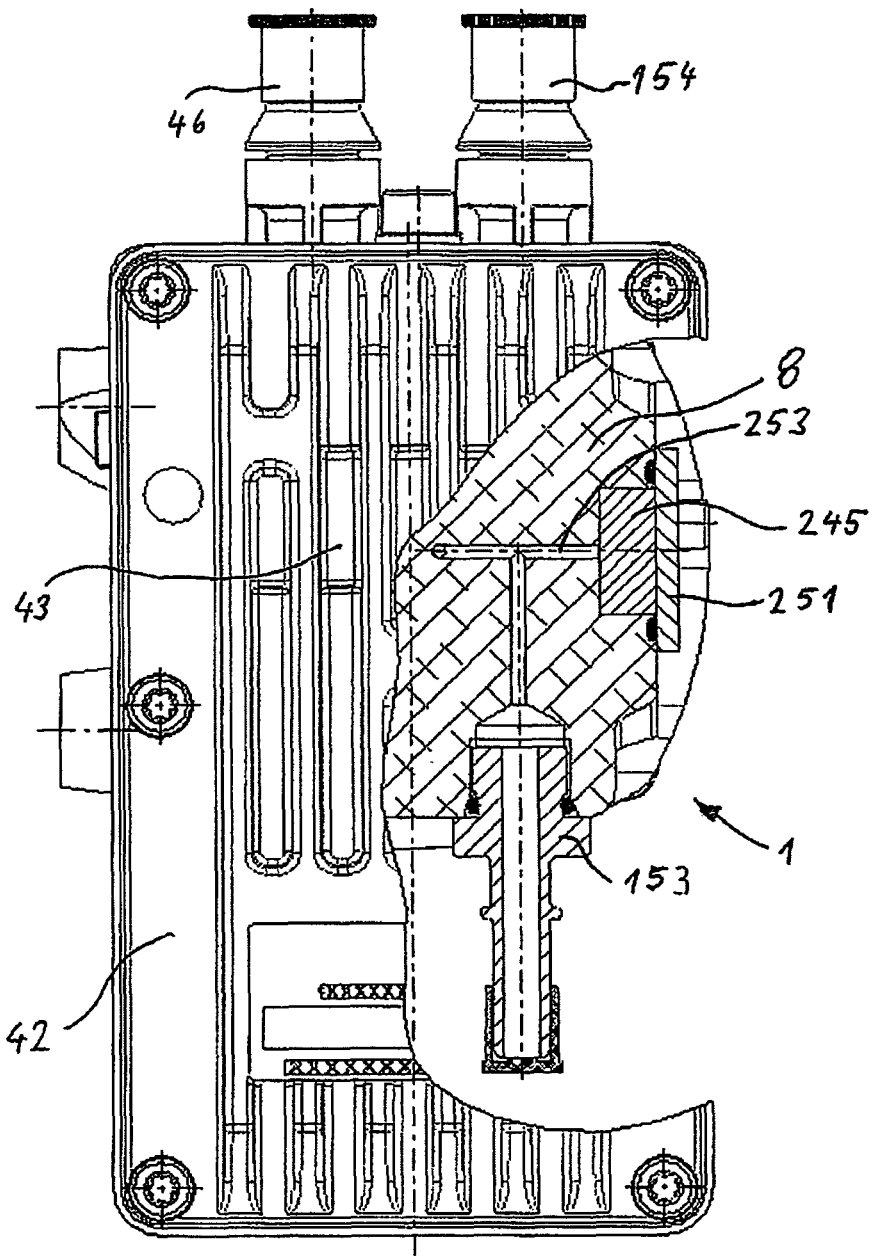
Figure 6:
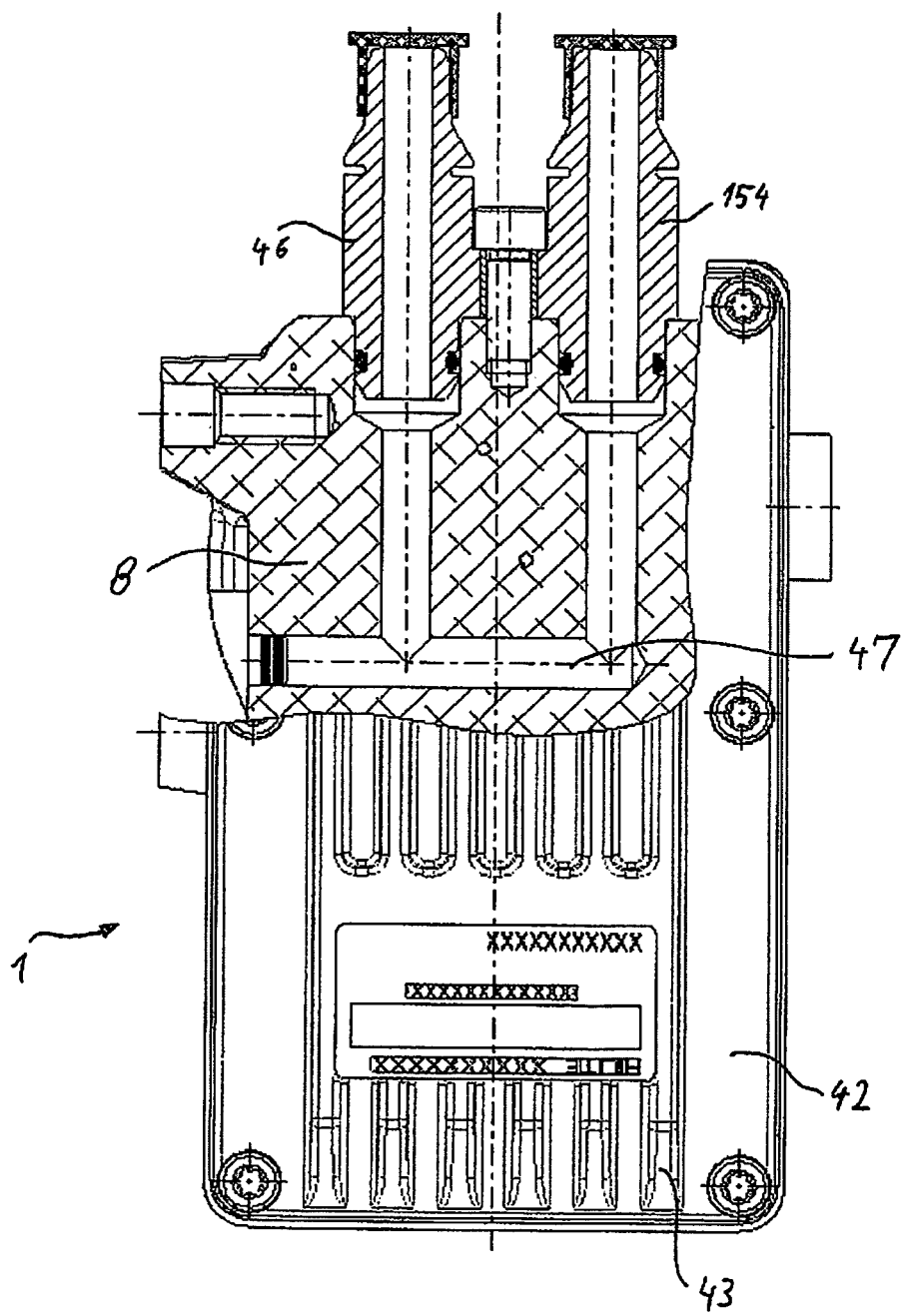

Provided on the side lying opposite the intake connection 12 of the intermediate housing 8 are two cooling water connections 46, 154, which can be seen especially in FIG. 4 to FIG. 6. These two cooling water connections 46, 154 lead to the two ends of a cooling channel 47, which is embedded in the intermediate housing 8. Because the two cooling water connections 46, 154, on the other hand, are connected to a cooling water circuit of the internal combustion engine 155, which is not shown in detail, the supply unit 1 can thus be kept thawed or at operating heat temperature by the hot cooling water from the cooling water circuit of the internal combustion engine 155.

Figure 9:
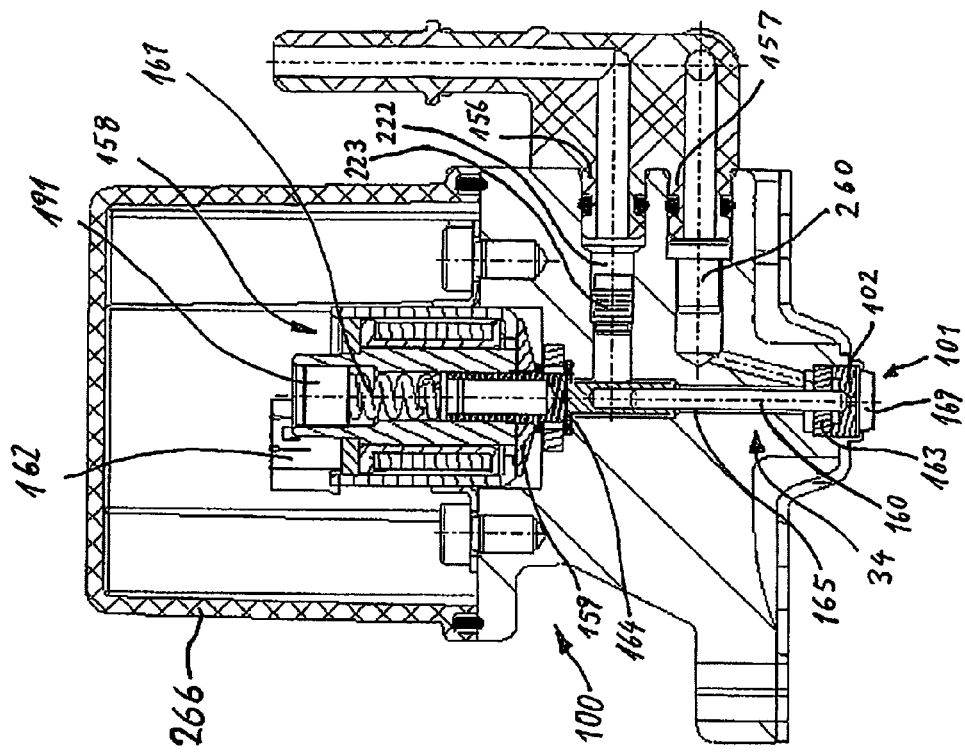
Figure 8:
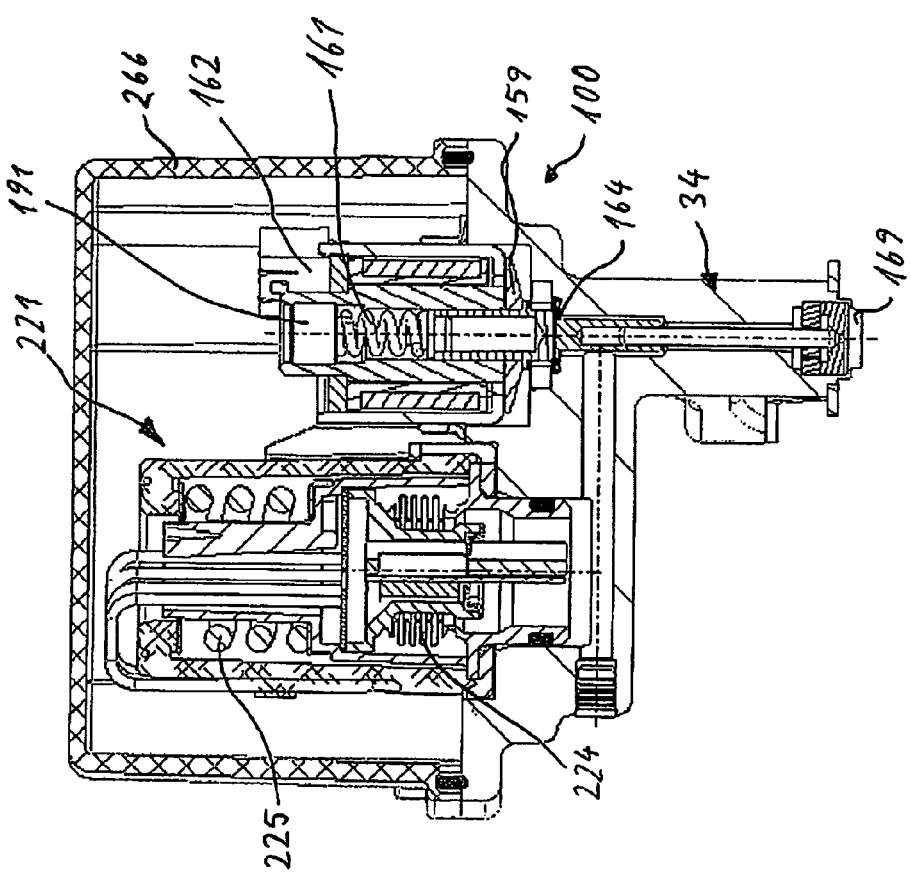
Figure 10:
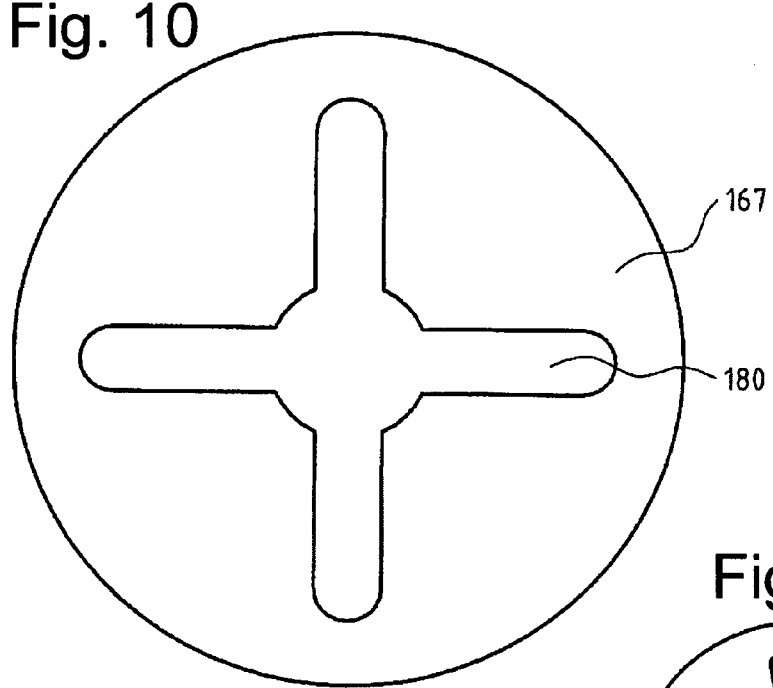
Figure 12:
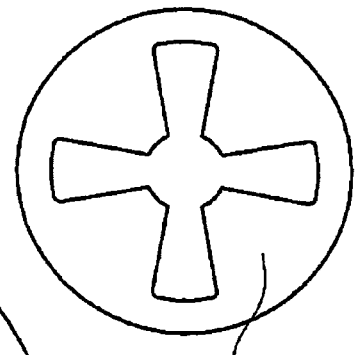
Figure 11:
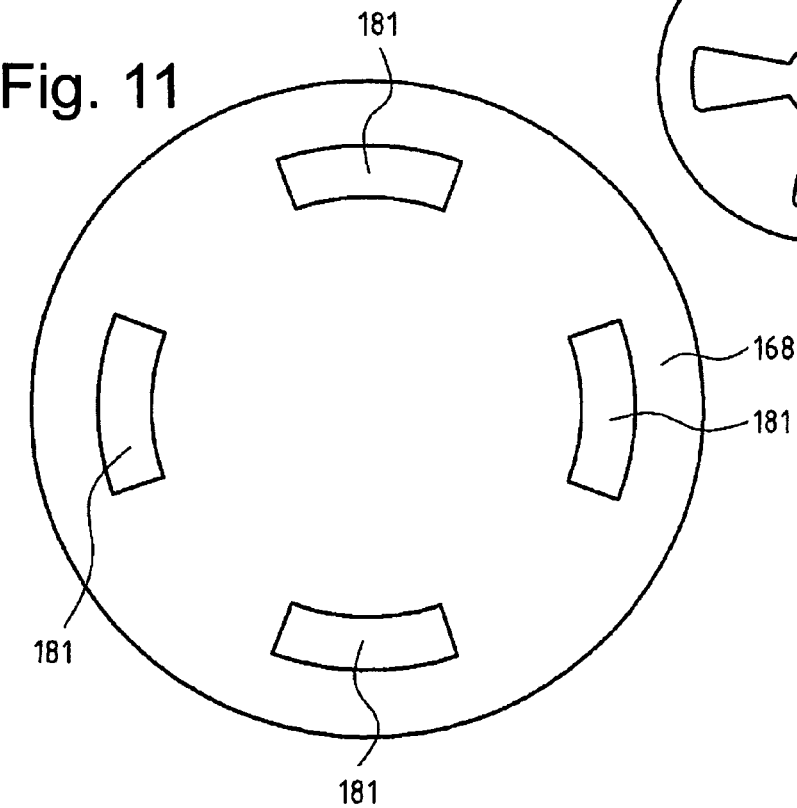

Illustrated in FIG. 8 and FIG. 9 is the first metering unit $D_1$ of the identically designed metering units $D1$, $D_2$, $D_n$ in two cut-away views. This metering unit $D_1$ comprises the electromagnetic metering valve 34. This electromagnetic metering valve 34 has an electromagnet 158 with an armature 159, which can press a helical compression spring 161 against its spring force, so that the AUS pressure can shift a needle 160 into the open position. In this case, the helical compression spring 161 rests on a threaded bolt 191, by means of which the pretension of the helical compression spring 161 can be adjusted. If the electromagnet 158 is not supplied with electric current via its terminals 162, the helical compression spring 161 presses the needle 160 once again against the valve seat 102 into a closed position. In this case, the needle 160 is relatively long and is guided, on the one side, in a linear sliding bearing 163. On the other side, the guiding takes place by means of a sealing membrane 164, which protects the electromagnet 158 against the aggressive AUS. Provided between these two guides is a cooling channel 165, which completes the circuit between the two said metering unit connections 156a, 157a. The first metering unit connection 156a is connected to the line 201 for this purpose, whereas the second metering unit connection 157a is connected to the line 50. From the one metering unit connection 157a, which is designed as an inlet, the AUS is conveyed via a filter sieve 260 through a plurality of recesses in the front linear sliding bearing 163 to the valve seat 102. If the AUS is allowed to pass through a central opening in the valve seat 102 in the current supplied state of the electromagnet 158, the AUS is passed through an atomizing nozzle 101. This atomizing nozzle 101 is designed as a pressure swirl nozzle and has the two nozzle discs 167, 168 placed over each other, illustrated in FIG. 10 and FIG. 11. In this case, these two nozzle discs 167, 168 are tensioned against the valve seat 102 by means of an output nozzle insert 169, with, additionally, an adapter plate 170, seen in FIG. 12, being tensioned between the nozzle discs 167, 168 and the valve seat 102. Provided for producing the tensioning of the adapter plate 170 and the nozzle discs 167, 168 is a crimping at the output nozzle insert 169, which is not illustrated in more detail. This output nozzle insert 169 has an output with a funnel-shaped enlargement—which is not seen in more detail. Due to the shaping of openings 180, 181 of the nozzle disks 167, 168, the out-flowing AUS is imparted a swirl, which atomizes the AUS when it is output.

The AUS is nozzle-injected, in accordance with FIG. 1, into a region of an exhaust gas train 177 that lies in front of a catalyst 178.

Via said proportional valve 223 of FIG. 1, the constant flow of AUS through the metering units $D_1$, $D_2$, $D_n$ is ensured. As a result, the temperature of the metering units $D_1$, $D_2$, $D_n$ is kept low, on the one hand. On the other hand, when the electric power supply is switched off, the pressure builds up to tank pressure in the exhaust gas aftertreatment device, without any energy being required for opening a valve.

All components of the exhaust gas aftertreatment device are designed so that a freezing of the unpressurized AUS does not lead to damage. This also applies as such to the metering units $D_1$, $D_2$, $D_n$. In the electromagnetic metering valve 34, the AUS can expand against the sealing membrane 164. Incorporated into the pressure and temperature sensor 221 is a bellows 224 made of metal, which can expand against a compression spring 225.

However, this also applies to the supply unit 1. In this supply unit 1, the AUS can expand against
the diaphragm 7,
a delimiter membrane 244, seen in FIG. 4, and
a compressible compensating element 245, seen in FIG. 5.

The delimiter membrane 244, seen in FIG. 4, belongs to a pressure-limiting valve 246, also seen in FIG. 1. Provided on the side of the delimiter membrane 244 facing away from the pressure-limiting valve 246 is a branch channel 252, which is linked to the AUS flow in the intermediate housing 8. The pressure-limiting valve 246 has a delimiter housing 250, which is screwed rigidly to the intermediate housing 8. Within the delimiter housing 250, the delimiter membrane 244 rests via a central supporting and guiding disc 247 and a helical compression spring 248 on an adjusting element 249 in an elastic manner. This adjusting element 249 is screwed from the outside into the delimiter housing 250. The pretensioning of the helical compression spring 248 can be adjusted by screwing it in and out.

The compressible compensating element 245, seen in FIG. 5, is held by means of a cover 251 in a recess of the intermediate housing 8. By means of a branch channel 253, the compressible compensating element 245 is linked in the AUS flow to the AUS pressure connection 153. In order to prevent any leakage of the aggressive AUS, an O-ring is arranged as a seal between the cover 251 and the intermediate housing 8.

A compressible compensating element similar to the compensating element 245 can also be arranged in or next to the pressure filter 3.

The other components of the exhaust gas aftertreatment device, that is, particularly
the tank 200
the lines 50, 151, 201,
the AUS intake connection 12,
the AUS pressure connection 153, and
the metering unit connections 156a, 156b, 157a, 157b
are also protected against freezing as a consequence of the choice of material and/or compressible compensating elements.

If individual or all components in an alternative embodiment are not designed to be protected against freezing, it is also possible to provide a device that enables the AUS to be sucked out or pumped out of the pump unit, so that, at external temperatures below the freezing point, there is no danger of destruction as a result of expanding AUS.

In particular, instead of the plastic shutter valves, it is also possible to employ ball check valves made of stainless steel.

The nozzle-injection into the exhaust gas train can take place in such a manner that each of the metering valves introduces AUS into the partial train of the exhaust gas manifold, which is assigned to a combustion compartment of an internal combustion engine. Alternatively, it is also possible to arrange a plurality of metering valves on a rim of a collecting pipe of the exhaust gas train, so that an exhaust gas flow having an especially large cross section is mixed nearly homogeneously with atomized AUS.

The described embodiments are only exemplary embodiments. A combination of the features described for different embodiments is also possible. Other features, particularly those not described, of the device parts belonging to the invention may be taken from the geometries of the device parts illustrated in the drawings.

The invention claimed is:

1. An SCR exhaust gas aftertreatment device comprising: a pump (2) configured to pressurize an aqueous urea solution in a line (50) connected to each inlet connection (157a, 157b) of each metering unit of a plurality of metering units ($D_1$, $D_2$, $D_n$), each metering unit of the plurality of metering units ($D_1$, $D_2$, $D_n$) having a metering valve (34) connected to the each inlet connection (157a, 157b) and the line (50) and an atomizing nozzle (101) to nozzle-inject the aqueous urea solution into an exhaust gas train (177), each metering unit of the plurality of metering units ($D_1$, $D_2$, $D_n$) having an outflow connection (156a, 156b), separate from the line (50), leading via a proportional valve (223) to a tank (200), and a pressure sensor (221) configured to determine a pressure existing in the line (50), each metering unit of the plurality of metering units ($D_1$, $D_2$, $D_n$) configured to nozzle-inject a portion of the aqueous urea solution into the exhaust gas train (177) while the pump (2) simultaneously circulates another portion of the aqueous urea solution via the proportional valve (223) to the tank (200).

2. The SCR exhaust gas aftertreatment device according to claim 1, further characterized in that the proportional valve (223) is completely closed when a quantity of aqueous urea solution to be injected is at a maximum.

3. The SCR exhaust gas aftertreatment device according to claim 2, further characterized in that each of the metering units ($D_1$, $D_2$, $D_n$) has a pressure sensor (221).

4. The SCR exhaust gas aftertreatment device according to claim 3, further characterized in that the metering units ($D_1$, $D_2$, $D_n$) are classified with the atomizing nozzles (101), with only metering units ($D_1$, $D_2$, $D_n$) of one class being employed at the SCR exhaust gas aftertreatment device.

5. The SCR exhaust gas aftertreatment device according to claim 4, further characterized in that a degree of opening of the proportional valve (223) is regulated by a control unit (ECU) depending on the injected quantity of the aqueous urea solution.

6. The SCR exhaust gas aftertreatment device according to claim 4, further characterized in that the proportional valve (223) is open when there is no electric current.

7. The SCR exhaust gas aftertreatment device according to claim 3, further characterized in that a degree of opening of the proportional valve (223) is regulated by a control unit (ECU) depending on the injected quantity of the aqueous urea solution.

8. The SCR exhaust gas aftertreatment device according to claim 3, further characterized in that the proportional valve (223) is open when there is no electric current.

9. The SCR exhaust gas aftertreatment device according to claim 2, further characterized in that a degree of opening of the proportional valve (223) is regulated by a control unit (ECU) depending on the injected quantity of the aqueous urea solution.

10. The SCR exhaust gas aftertreatment device according to claim 2, further characterized in that the proportional valve (223) is open when there is no electric current.

11. The SCR exhaust gas aftertreatment device according to claim 1, further characterized in that each of the metering units ($D_1$, $D_2$, $D_n$) has a pressure sensor (221).

12. The SCR exhaust gas aftertreatment device according to claim 11, further characterized in that the metering units ($D_1$, $D_2$, $D_n$) are classified with the atomizing nozzles (101), with only metering units ($D_1$, $D_2$, $D_n$) of one class being employed at the SCR exhaust gas aftertreatment device.

13. The SCR exhaust gas aftertreatment device according to claim 11, further characterized in that a degree of opening of the proportional valve (223) is regulated by a control unit (ECU) depending on an injected quantity of the aqueous urea solution.

14. The SCR exhaust gas aftertreatment device according to claim 11, further characterized in that the proportional valve (223) is open when there is no electric current.

15. The SCR exhaust gas aftertreatment device according to claim 1, further characterized in that a degree of opening of the proportional valve (223) is regulated by a control unit (ECU) depending on an injected quantity of the aqueous urea solution.

16. The SCR exhaust gas aftertreatment device according to claim 15, further characterized in that the proportional valve (223) is open when there is no electric current.

17. The SCR exhaust gas aftertreatment device according to claim 1, further characterized in that the proportional valve (223) is open when there is no electric current.

18. An SCR exhaust gas aftertreatment device comprising: a pump (2) configured to pressurize an aqueous urea solution in a line (50) connected to each inlet connection (157a, 157b) of each metering unit of a plurality of metering units (D1, D2, Dn), each metering unit of the plurality of metering units (D1, D2, Dn) having a metering valve (34) connected to the each inlet connection (157a, 157b) and the line (50), an atomizing nozzle (101) to nozzle-inject the aqueous urea solution into an exhaust gas train (177), an outflow connection (156a, 156b), separate from the line (50), leading via a proportional valve (223) to a tank (200), and a pressure sensor (221) configured to determine a pressure existing in the line (50), wherein a predominant theoretical value for regulating the pump (2) is formed from a mean value of output signals of the pressure sensors (221).

19. The SCR exhaust gas aftertreatment device according to claim 18, further characterized in that a degree of opening of the proportional valve (223) is regulated by a control unit (ECU) depending on an injected quantity of the aqueous urea solution.

20. The SCR exhaust gas aftertreatment device according to claim 18, further characterized in that the proportional valve (223) is open when there is no electric current.

21. An SCR exhaust gas aftertreatment device comprising: a pump (2) configured to pressurize an aqueous urea solution in a line (50) connected to each inlet connection (157a, 157b) of each metering unit of a plurality of metering units (D1, D2, Dn), each metering unit of the plurality of metering units (D1, D2, Dn) having a metering valve (34) connected to the each inlet connection (157a, 157b) and the line (50), an atomizing nozzle (101) to nozzle-inject the aqueous urea solution into an exhaust gas train (177), an outflow connection (156a, 156b), separate from the line (50), leading via a proportional valve (223) to a tank (200), and a pressure sensor (221) configured to determine a pressure existing in the line (50), wherein a predominant theoretical value for regulating the pump (2) is formed from a mean value of output signals of the pressure sensors (221), and the proportional valve (223) is completely closed when a quantity of aqueous urea solution to be injected is at a maximum.

22. The SCR exhaust gas aftertreatment device according to claim 21, further characterized in that a degree of opening of the proportional valve (223) is regulated by a control unit (ECU) depending on the injected quantity of the aqueous urea solution.

23. The SCR exhaust gas aftertreatment device according to claim 21, further characterized in that the proportional valve (223) is open when there is no electric current.

* * * * *